US011870131B2

(12) United States Patent
Feng et al.

(10) Patent No.: US 11,870,131 B2
(45) Date of Patent: Jan. 9, 2024

(54) ELECTRONIC DEVICE

(71) Applicant: ASUSTeK COMPUTER INC., Taipei (TW)

(72) Inventors: Zhi-Hua Feng, Taipei (TW); Wei-Shao Su, Taipei (TW); Pin-Tang Chiu, Taipei (TW)

(73) Assignee: ASUSTEK COMPUTER INC., Taipei (TW)

( * ) Notice: Subject to any disclaimer, the term of this patent is extended or adjusted under 35 U.S.C. 154(b) by 5 days.

(21) Appl. No.: 17/584,608

(22) Filed: Jan. 26, 2022

(65) Prior Publication Data

US 2022/0263227 A1 Aug. 18, 2022

(30) Foreign Application Priority Data

Feb. 17, 2021 (TW) ................................. 110105290

(51) Int. Cl.
*H01Q 1/24* (2006.01)
*H04B 7/06* (2006.01)

(52) U.S. Cl.
CPC .......... *H01Q 1/243* (2013.01); *H04B 7/0602* (2013.01)

(58) Field of Classification Search
CPC .......... H01Q 1/24; H01Q 1/241; H01Q 1/243; H01Q 3/24; H04B 7/04; H04B 7/06; H04B 7/0602; H04B 7/0691; H04B 7/0802; H04B 7/0814

See application file for complete search history.

(56) References Cited

U.S. PATENT DOCUMENTS

| 8,793,000 | B2 | 7/2014 | Mujtaba et al. | |
| 2009/0295648 | A1* | 12/2009 | Dorsey | H01Q 21/28 343/702 |
| 2012/0281553 | A1* | 11/2012 | Mujtaba | H01Q 21/28 370/252 |
| 2012/0315851 | A1* | 12/2012 | Park | H04B 7/0814 455/575.7 |
| 2013/0273856 | A1* | 10/2013 | Park | H04B 7/0602 455/73 |
| 2017/0118323 | A1* | 4/2017 | Kim | H04M 1/72412 |
| 2020/0127715 | A1* | 4/2020 | Sheng | H04B 7/0486 |

FOREIGN PATENT DOCUMENTS

| CN | 105425218 A | 3/2016 | |
| CN | 110086552 A | 8/2019 | |
| WO | WO-2020221101 A1 * | 11/2020 | ............. H04B 1/005 |

* cited by examiner

*Primary Examiner* — Thai Pham
(74) *Attorney, Agent, or Firm* — McClure, Qualey & Rodack, LLP

(57) ABSTRACT

An electronic device is provided, including: a plurality of antennas, a switch, a sensor, a wireless communication transceiver, and a processor, electrically connected to antennas, the switch, the sensor, and the wireless communication transceiver, and configured to execute an antenna selection procedure according to a scenario of the electronic device, to connect at least one of the antennas to the sensor or the wireless communication transceiver through the switch.

11 Claims, 3 Drawing Sheets

ELECTRONIC DEVICE

CROSS-REFERENCE TO RELATED APPLICATION

This application claims the priority benefit of Taiwan Application Serial No. 110105290, filed on Feb. 17, 2021. The entirety of the above-mentioned patent application is hereby incorporated by reference herein and made a part of the specification.

BACKGROUND OF THE INVENTION

Field of the Invention

The disclosure relates to an electronic device, and in particular, to an electronic device where a sensor and a wireless communication transceiver share a plurality of sets of antennas.

Description of the Related Art

In order to improve the communication speed and stability of an electronic device, a wireless communication transceiver in the electronic device is used in combination with a plurality of sets of antennas. However, for a multi-antenna switching technology of the wireless communication transceiver, signal strength of signals received by the plurality of sets of antennas needs to be periodically detected, and an antenna with best signal strength is selected while unselected antennas enter an idle state.

In addition, if the electronic device includes a sensor configured to detect a physiological status, an antenna for the sensor is independent from an antenna for the wireless communication transceiver, and when the sensor is not operating, idle antennas are increased.

BRIEF SUMMARY OF THE INVENTION

According to an aspect of the disclosure, an electronic device is provided. The electronic device includes a plurality of antennas, a switch, a sensor, a wireless communication transceiver, and a processor. The processor is electrically connected to the antenna, the switch, the sensor, and the wireless communication transceiver, and is configured to execute an antenna selection procedure according to a scenario of the electronic device, to electrically connect at least one of the antennas to the sensor or the wireless communication transceiver through the switch.

In summary, in the electronic device of the disclosure, there is no need to independently dispose an antenna for the sensor or an antenna for the wireless communication transceiver, and a suitable antenna is reallocated to the sensor and the wireless communication transceiver when a scenario changes.

After referring to the drawings and the embodiments described later, a person of ordinary skill in the art understands other objectives of the disclosure, and the technical means and implementations of the disclosure.

DETAILED DESCRIPTION OF THE EMBODIMENTS

Figure 1:
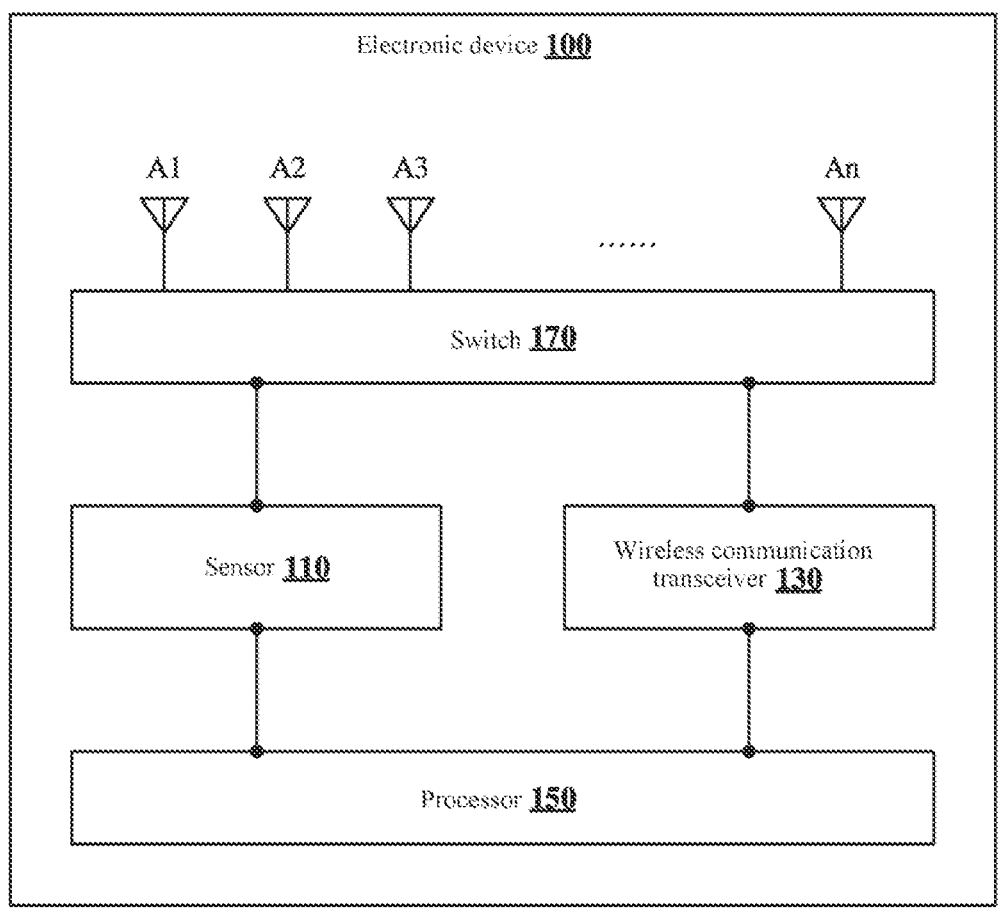
FIG. 1 is a schematic diagram of an electronic device according to a first embodiment of the disclosure.

The following embodiments are used for illustrating the technical content of the disclosure, but are not intended to limit the scope of the disclosure. It is to be noted that in the following embodiments and drawings, components that are not related to the disclosure have been omitted and are not shown. Dimensional relations of the components in the drawings are merely for ease of understanding, and are not intended to limit actual ratio.

Figure 2:
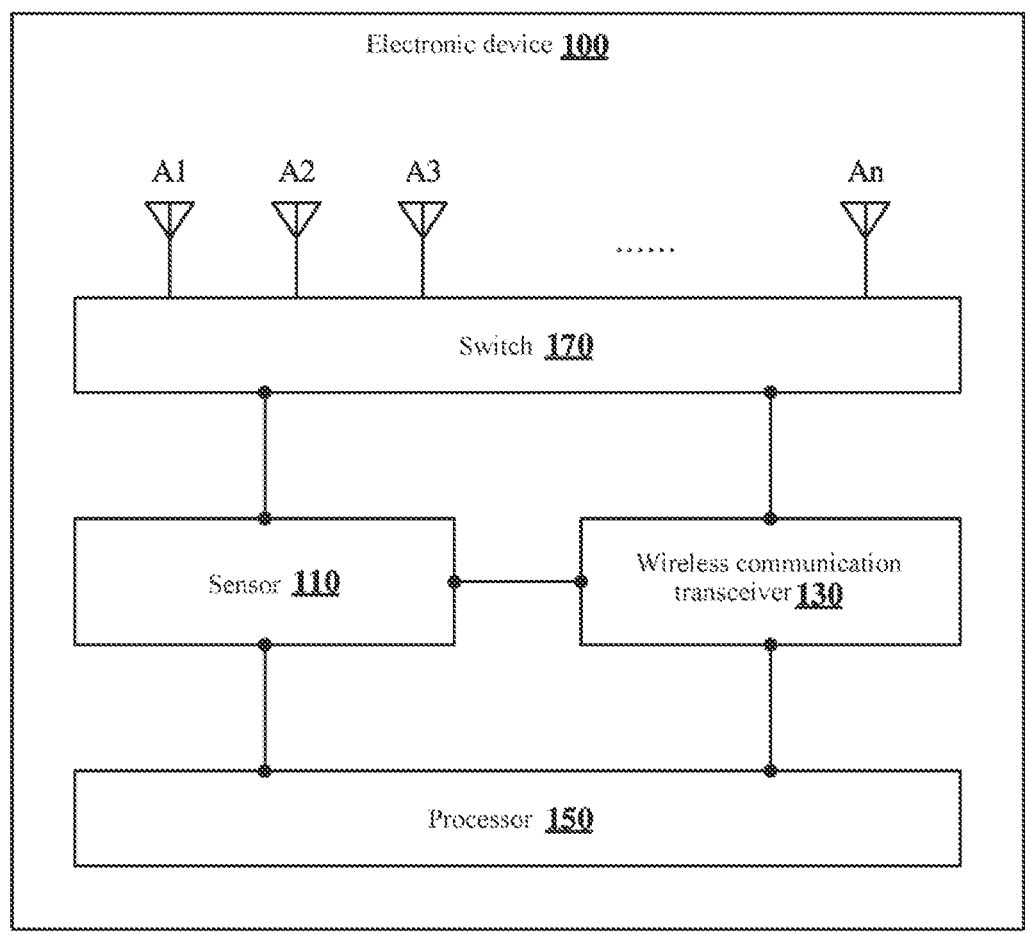
FIG. 2 is a schematic diagram of an electronic device according to a second embodiment of the disclosure.

FIG. 1 and FIG. 2 are schematic diagrams of an electronic device according to the disclosure. The electronic device 100 includes a plurality of antennas A1, A2, A3, ..., and An, a sensor 110, a wireless communication transceiver 130, a processor 150, and a switch 170. The processor 150 is electrically connected to the antennas A1, A2, A3, ..., and An, the sensor 110, the wireless communication transceiver 130, and the switch 170. The sensor 110 and the wireless communication transceiver 130 are electrically connected to the switch 170.

In an embodiment, the electronic device 100 is a notebook computer, a smartphone, a tablet computer or the like. In an embodiment, the sensor 110 detects a physiological status such as breath or heartbeat of a user of the electronic device 100. In an embodiment, a wireless communication transceiver 130 is at least one of a Bluetooth transceiver, a Wi-Fi transceiver, or a radio frequency transceiver, and a sensor 110 is a radar sensor.

In an embodiment, the processor 150 executes an antenna selection procedure according to a scenario of the electronic device 100, to allocate at least one of the antennas A1, A2, A3, ..., and An to be electrically connected with at least one of the sensor 110 or the wireless communication transceiver 130.

In an embodiment, when the processor 150 determines that the scenario is to enable both a wireless transmission function and a physiological detection function, the processor 150 executes the antenna selection procedure. In the antenna selection procedure, the processor 150 controls the switch 170 to electrically connect a directional antenna (such as the antenna A1) among the antennas A1, A2, A3, ..., and An to the sensor 110, to transmit and receive sensing signals through the antenna A1. Then, the processor 150 controls the switch 170 to electrically connect at least one antenna (such as the antennas A2 and A3) of the remaining antennas A2, A3, ..., and An with the wireless communication transceiver 130, to transmit and receive communication signals through the antennas A2 and A3. Specifically, the processor 150 first selects the directional antenna A1 from the antennas A1, A2, A3, ..., and An to be electrically connected with the sensor 110. When a plurality of antennas A1, A4, ..., and An among the antennas A1, A2, A3, ..., and An is directional antennas, the processor 150 further compares signal strength values of the directional antennas A1, A4, ..., and An, and selects the directional antenna A1 with stronger signal strength from the directional antennas A1, A4, ..., and An to be electrically connected to the sensor 110. Then, the processor 150 compares signal strength values of the remaining antennas A2, A3, ..., and An, and selects antennas A2 and A3 with stronger signal strength from the antennas A2, A3, ..., and An to be electrically connected to the wireless communication transceiver 130.

In an embodiment, when the processor 150 determines that the scenario is to enable both a wireless transmission function and a physiological detection function, the processor 150 executes the antenna selection procedure. In the antenna selection procedure, the processor 150 also controls the switch 170 to first electrically connect at least one antenna (such as the antennas A2 and A3) of the antennas A1, A2, A3, . . . , and An to the wireless communication transceiver 130, to transmit and receive communication signals through the antennas A2 and A3. Then, the processor 150 controls the switch 170 to electrically connect a directional antenna (such as the antenna A1) among the antennas A1, A4, . . . , and An to the sensor 110, to transmit and receive sensing signals through the antenna A1. Specifically, the processor 150 first compares signal strength values of the antennas A1, A2, A3, . . . , and An, and selects the antennas A2 and A3 with stronger signal strength from the antennas A1, A2, A3, . . . , and An to be electrically connected with the wireless communication transceiver 130. Then, the processor 150 selects the directional antenna A1 from the antennas A1, A2, A3, . . . , and An to be electrically connected to the sensor 110.

In an embodiment, the processor 150 selects the antenna A1 with stronger signal strength from the antennas A1, A2, A3, . . . , and An to be electrically connected to the wireless communication transceiver 130. Because the antenna A1 is a directional antenna, when the processor 150 needs to select an antenna electrically connected to the sensor 110, the processor 150 controls the switch 170 to connect the antenna A1 with the sensor 110. Then, the processor 150 selects the antenna A2 with stronger signal strength from the remaining antennas A2, A3, . . . , and An to be electrically connected to the wireless communication transceiver 130.

Because the sensor 110 uses a highly directional antenna to increase accuracy of transmitting and receiving signals, the processor 150 preferentially selects the directional antenna A1 to be electrically connected to the sensor 110. That is, the sensor 110 has a priority to use a directional antenna.

In an embodiment, when the processor 150 determines that the scenario is to enable a physiological detection function and disable a wireless transmission function, the processor 150 executes the antenna selection procedure. In the antenna selection procedure, the processor 150 selects the antenna A1 that is a directional antenna of the antennas A1, A2, A3, . . . , and An to be electrically connected to the sensor 110, to transmit and receive sensing signals through the antenna A1. When a plurality of antennas A1, A4, . . . , and An of the antennas A1, A2, A3, . . . , and An are directional antennas, the processor 150 further compares signal strength values of the directional antennas A1, A4, . . . , and An, and selects the directional antenna A1 with stronger signal strength from the directional antennas A1, A4, . . . , and An to be electrically connected to the sensor 110.

In an embodiment, when the processor 150 determines that the scenario is to enable a wireless transmission function and disable a physiological detection function, the processor 150 executes the antenna selection procedure. In the antenna selection procedure, the processor 150 further compares signal strength values of the antennas A1, A2, A3, . . . , and An, and selects the antenna A2 with stronger signal strength from the antennas A1, A2, A3, . . . , and An to be electrically connected to the wireless communication transceiver 130, to transmit and receive communication signals through the antenna A2.

Referring to FIG. 1, in this embodiment, the sensor 110 generates a sensing signal automatically and transmits the sensing signal to an antenna connected to the sensor 110 for external transmission. Referring to FIG. 2, in this embodiment, the sensor 110 is electrically connected to the wireless communication transceiver 130, to receive a sensing signal from the wireless communication transceiver 130 and then transmit the sensing signal to an antenna connected to the sensor 110 for external transmission.

In an embodiment, when the processor 150 determines that a frequency that signal strength of an antenna electrically connected to the sensor 110 is lower than a first signal threshold is higher than a first preset frequency, or a frequency that signal strength of an antenna electrically connected to the wireless communication transceiver 130 is lower than a second signal threshold is higher than a second preset frequency, the processor 150 restarts the antenna selection procedure. The first signal threshold and the second signal threshold are the same or different, and the first preset frequency and the second preset frequency are the same or different.

In an embodiment, when the processor 150 determines that a connection time between the sensor 110 and an antenna is longer than a first preset connection time, or a connection time between the wireless communication transceiver 130 and an antenna connected to the wireless communication transceiver 130 is longer than a second preset connection time, the processor 150 restarts the antenna selection procedure, where the first preset connection time and the second preset connection time increase exponentially according to a frequency that the antenna selection procedure is executed. The first preset connection time and the second preset connection time are the same or different.

In an embodiment, when a sensing signal received by the sensor 110 becomes weaker or a communication signal received by the wireless communication transceiver 130 becomes weaker, the processor 150 re-executes the antenna selection procedure. Specifically, when the processor 150 detects that a signal strength value of the sensing signal received by the sensor 110 is lower than a first threshold or detects that a signal strength value of the communication signal received by the wireless communication transceiver 130 is lower than a second threshold, the processor 150 re-executes the antenna selection procedure. In an embodiment, the processor 150 restarts the antenna selection procedure after a preset time interval (such as 5 minutes or 10 minutes).

Figure 3:
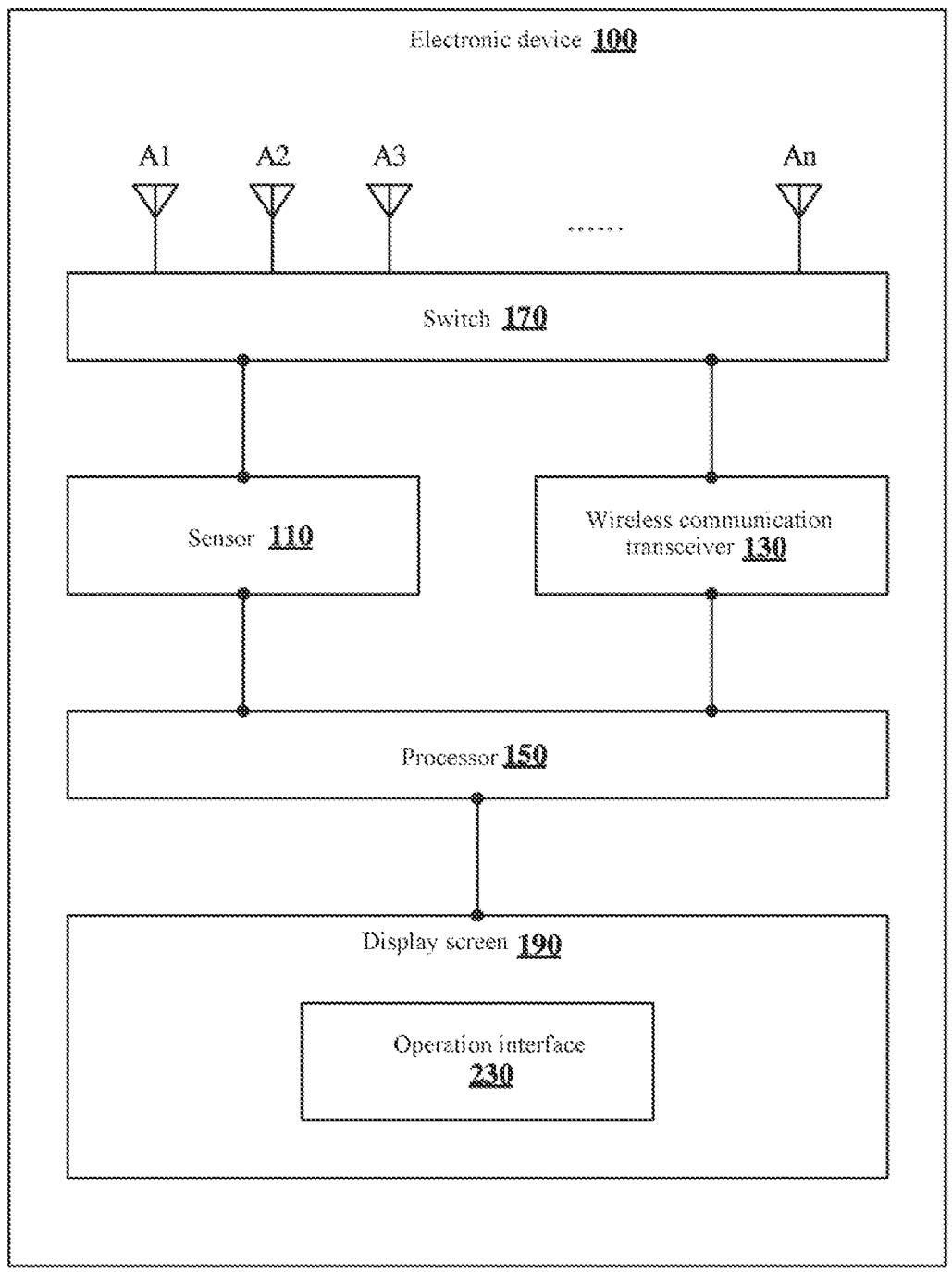
FIG. 3 is a schematic diagram of an electronic device according to a third embodiment of the disclosure.

Referring to FIG. 3, in an embodiment, the electronic device 100 further includes a display screen 190. The processor 150 is electrically connected to the display screen 190, through which the processor 150 displays an operation interface 230 for a user to select to enable or disable a wireless transmission function or a physiological detection function. The processor 150 determines whether to perform wireless transmission or physiological detection according to the selection of the user on the operation interface 230, to execute the corresponding antenna selection procedure.

In summary, the sensor and the wireless communication transceiver of the electronic device in the disclosure share a plurality of sets of antennas, so that when a scenario of the electronic device changes, the processor of the electronic device executes an antenna selection procedure to allocate an antenna for the sensor and the wireless communication transceiver, and restarts the antenna selection procedure when signal strength of the antenna is weaker after a preset time interval. Therefore, through the antenna selection procedure in the disclosure, idle antennas are greatly reduced.

The foregoing embodiments are merely used to illustrate the implementation manners of the disclosure and explain the technical features of the disclosure, but are not intended to limit the scope of the disclosure. Any variations or equivalent arrangements made by a person skilled in the art without creative efforts shall fall in the scope of the disclosure. Therefore, the protection scope of the disclosure is subject to the appended claims.

What is claimed is:

1. An electronic device, comprising:
   a plurality of antennas,
   a switch;
   a sensor;
   a wireless communication transceiver; and
   a processor, electrically connected to the antennas, the switch, the sensor, and the wireless communication transceiver, and configured to execute an antenna selection procedure according to a scenario of the electronic device, to electrically connect at least one of the antennas with the sensor or the wireless communication transceiver through the switch,
   wherein the processor is further configured to perform the following operation:
   restarting the antenna selection procedure when the processor determines that a frequency that signal strength of an antenna electrically connected to the sensor is lower than a first signal threshold is higher than a first preset frequency, or a frequency that signal strength of an antenna electrically connected to the wireless communication transceiver is lower than a second signal threshold is higher than a second preset frequency.

2. The electronic device according to claim 1, wherein the processor controls the switch to electrically connect a directional antenna among the antennas with the sensor when the scenario is to enable a physiological detection function and disable a wireless transmission function.

3. The electronic device according to claim 2, wherein the antennas comprises a plurality of directional antennas, and the processor is further configured to perform the following operation:
   the processor further compares signal strength values of the directional antennas, and selects one of the directional antennas with a stronger signal strength being electrically connected to the sensor.

4. The electronic device according to claim 1, wherein when the scenario is to enable both a wireless transmission function and a physiological detection function, the processor is further configured to perform the following operations:
   controlling the switch to electrically connect a directional antenna among the antennas to the sensor; and
   controlling the switch to electrically connect at least one antenna of the remaining antennas with the wireless communication transceiver.

5. The electronic device according to claim 1, wherein the sensor is a radar sensor.

6. The electronic device according to claim 1, wherein the processor restarts the antenna selection procedure when the processor determines that a connection time between the sensor and an antenna is longer than a first preset connection time, or a connection time between the wireless communication transceiver and an antenna is longer than a second preset connection time.

7. The electronic device according to claim 6, wherein the first preset connection time and the second preset connection time increase exponentially according to a frequency that the processor executes the antenna selection procedure.

8. The electronic device according to claim 1, wherein when a sensing signal received by the sensor from an antenna connected to the sensor becomes weaker or a communication signal received by the wireless communication transceiver from an antenna connected to the wireless communication transceiver becomes weaker, the processor restarts the antenna selection procedure.

9. The electronic device according to claim 1, wherein the electronic device further comprises a display screen, and the processor is electrically connected to the display screen and displays an operation interface through the display screen, to enable or disable a wireless transmission function or a physiological detection function.

10. An electronic device, comprising:
    a plurality of antennas,
    a switch;
    a sensor;
    a wireless communication transceiver; and
    a processor, electrically connected to the antennas, the switch, the sensor, and the wireless communication transceiver, and configured to execute an antenna selection procedure according to a scenario of the electronic device, to electrically connect at least one of the antennas with the sensor or the wireless communication transceiver through the switch,
    wherein the processor restarts the antenna selection procedure when the processor determines that a connection time between the sensor and an antenna is longer than a first preset connection time, or a connection time between the wireless communication transceiver and an antenna is longer than a second preset connection time.

11. An electronic device, comprising:
    a plurality of antennas,
    a switch;
    a sensor;
    a wireless communication transceiver; and
    a processor, electrically connected to the antennas, the switch, the sensor, and the wireless communication transceiver, and configured to execute an antenna selection procedure according to a scenario of the electronic device, to electrically connect at least one of the antennas with the sensor or the wireless communication transceiver through the switch,
    wherein when a sensing signal received by the sensor from an antenna connected to the sensor becomes weaker or a communication signal received by the wireless communication transceiver from an antenna connected to the wireless communication transceiver becomes weaker, the processor restarts the antenna selection procedure.

* * * * *